United States Patent [19]

Fredriksson

[11] Patent Number: 5,285,821
[45] Date of Patent: Feb. 15, 1994

[54] ARRANGEMENT FOR CONTROLLING FEED ELEMENTS ON A TEXTILE MACHINE

[75] Inventor: Lars-Berno Fredriksson, Kinna, Sweden

[73] Assignee: IRO AB, Ulricehamn, Sweden

[21] Appl. No.: 768,667

[22] PCT Filed: Feb. 15, 1990

[86] PCT No.: PCT/SE90/00099
§ 371 Date: Sep. 30, 1991
§ 102(e) Date: Sep. 30, 1991

[87] PCT Pub. No.: WO90/09475
PCT Pub. Date: Aug. 23, 1990

[30] Foreign Application Priority Data

Feb. 16, 1989 [SE] Sweden .............................. 8900534

[51] Int. Cl.⁵ ..................... D03D 47/36; D03D 47/38; D03D 49/00
[52] U.S. Cl. ................................. 139/452; 66/125 R; 139/1 R; 242/47.01; 364/921.1
[58] Field of Search .................. 66/125 R; 242/47.01; 139/1 R, 452, 435.1; 364/921.1, 470

[56] References Cited

U.S. PATENT DOCUMENTS

| | | | |
|---|---|---|---|
| 4,716,943 | 1/1988 | Yoshida et al. | 139/452 |
| 4,752,044 | 6/1988 | Memminger et al. | |
| 4,764,875 | 8/1988 | Carrotte et al. | 66/125 R |
| 4,936,356 | 6/1990 | Ghiardo | 139/452 |

Primary Examiner—Andrew M. Falik
Attorney, Agent, or Firm—Flynn, Thiel, Boutell & Tanis

[57] ABSTRACT

A yarn supply system having a plurality of feeders associated with a textile machine. Each feeder having its own speed control system including a variable speed drive motor and a variable speed controller which includes a programmable control unit which is capable of responding to the actual yarn consumption requirements and responding to a main control apparatus message. The main control apparatus including a yarn feed rate anticipating unit that represents additional intelligence to the feeders. The yarn feed rate anticipating unit becomes informed about a weaving pattern stored in the main control apparatus memory and transfers a message via a message transfer network to individual feeder programmable control units to accelerate or decelerate in advance of an actual winding-on requirement.

8 Claims, 10 Drawing Sheets

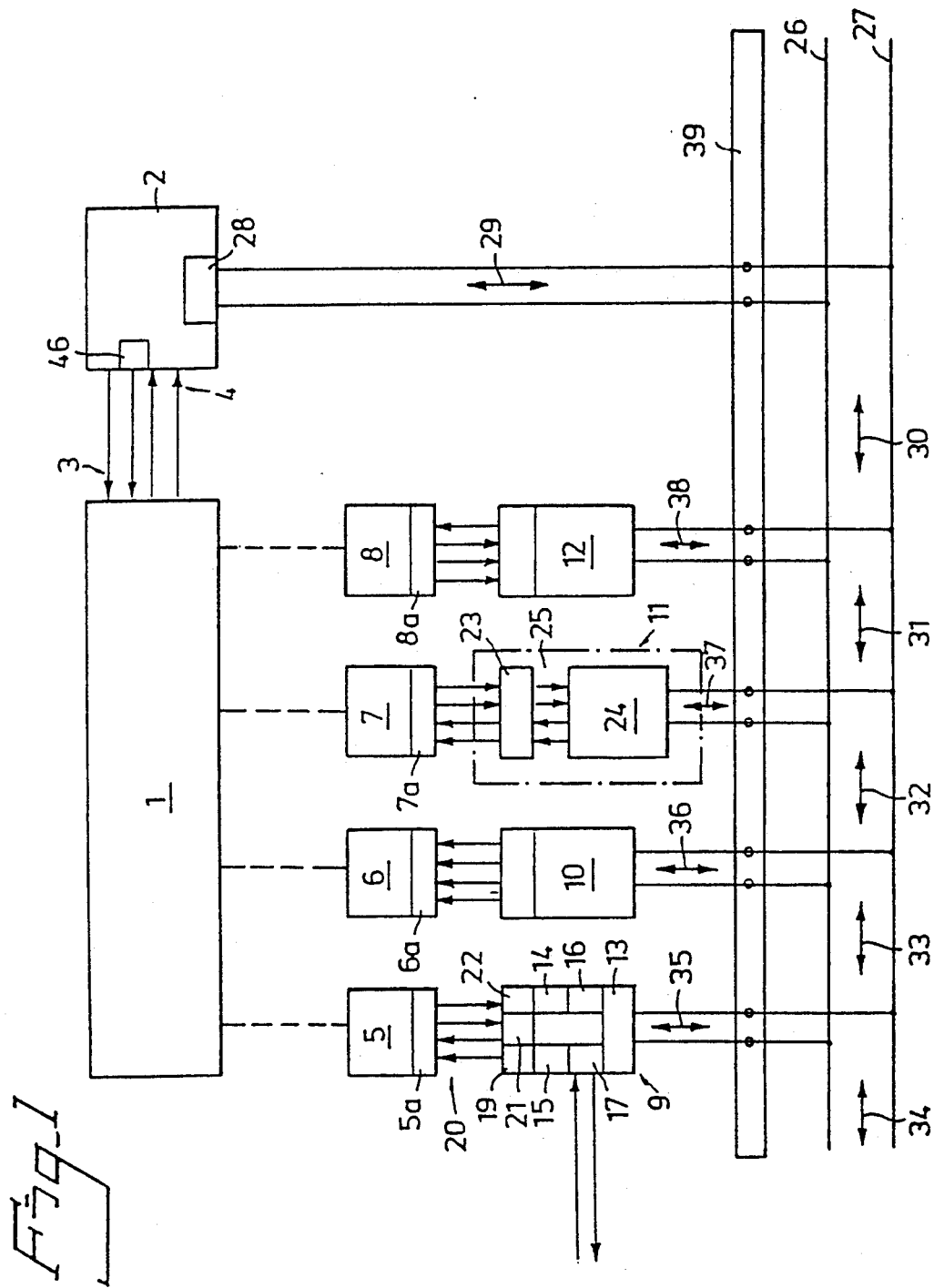

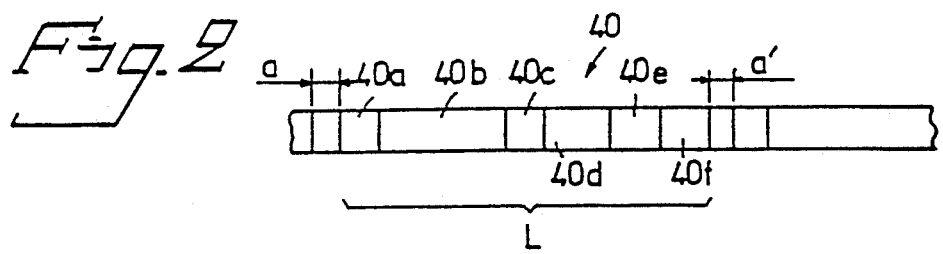
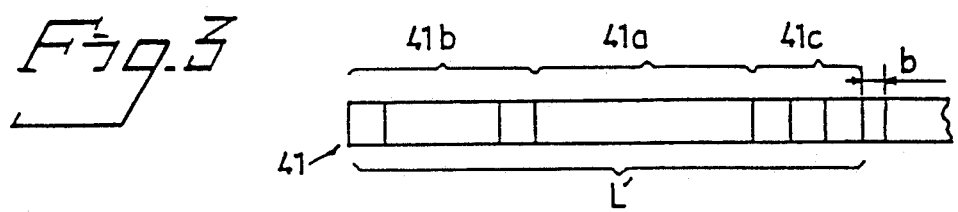
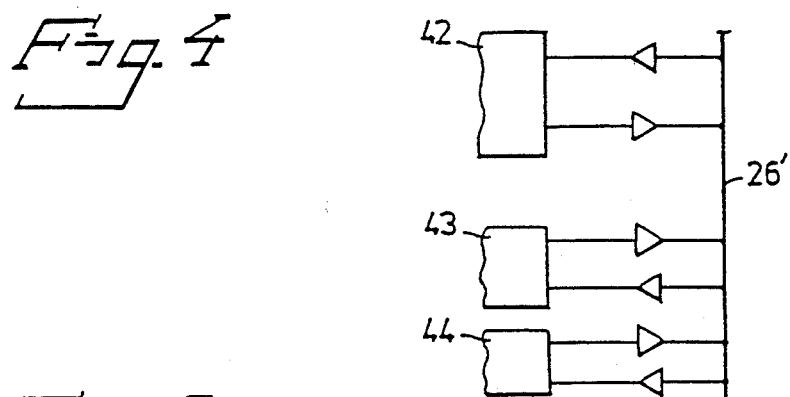
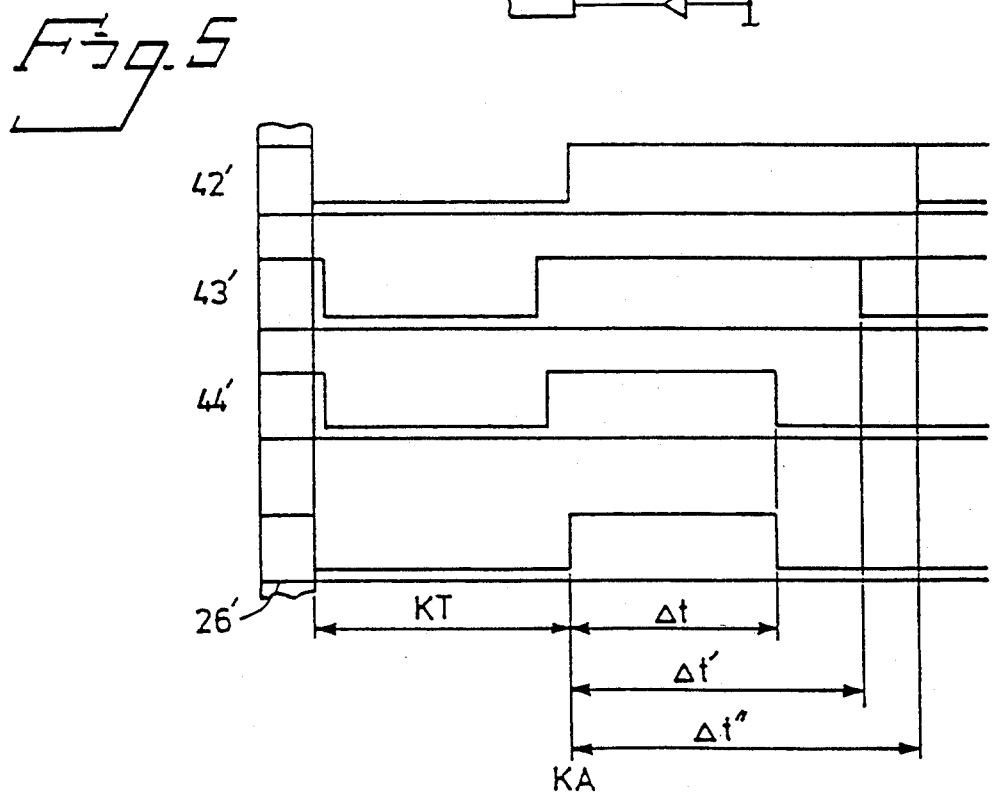

Fig. 4a

| | START | B1 | B2 | B3 | B4 | B5 | B6 | B7 | B8 |
|---|---|---|---|---|---|---|---|---|---|
| 42 | | 1 | 0 | 0 | 0 | 0 | 0 | 0 | 0 |
| 43 | | 0 | 0 | 1 | 0 | 0 | 0 | 0 | 0 |
| 44 | | 0 | 0 | 0 | 0 | 1 | 1 | 1 | 1 |

26'

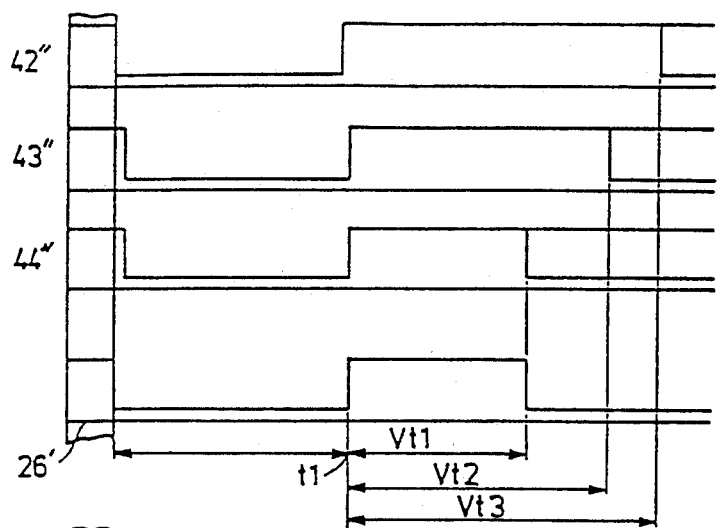
Fig. 6
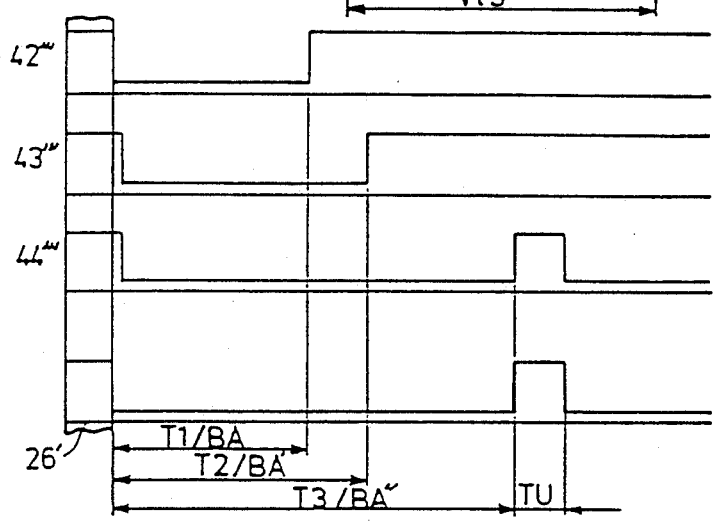
Fig. 7
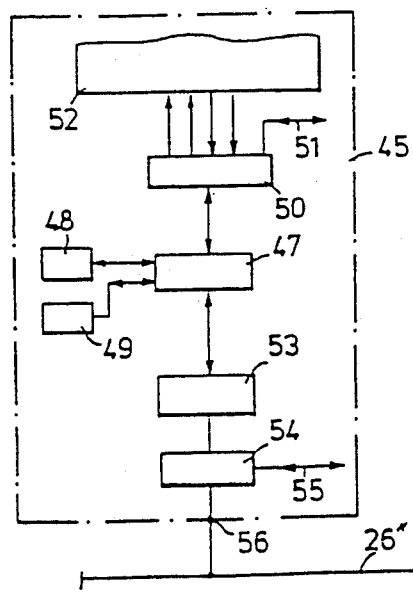
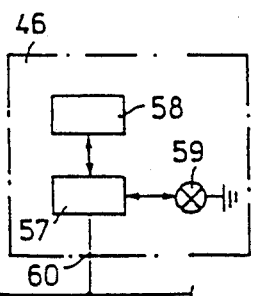
Fig. 8

ARRANGEMENT FOR CONTROLLING FEED ELEMENTS ON A TEXTILE MACHINE

BACKGROUND OF THE INVENTION

1. Field of the Invention

The present invention relates to an arrangement for controlling and/or supervising, with the aid of a computerized system, a number of elements/functions forming part of a textile machine, feed elements/feed functions being intended here in the first instance. For each element/function the system has one or more units, which serve the element/the function and which together with other units form a network in the system. One or more units in the system can moreover, if necessary, serve more than one element/one function.

2. Description of the Prior Art

An example of functions which have to be controlled and supervised in a weaving machine is e.g. checking whether the yarn is properly fed so yarn break is prevented, the weaving result is of high quality, etc. In a weaving loom it is today typically necessary to be able to initiate 1200 picks/minute.

It is previously known to provide elements in a textile machine with a computer for control of functions of the elements and of the machine, and it is likewise previously known to electronically control and supervise a function/functions of the yarn feed elements of a weaving machine.

The feeders exist in different types and variants and have to be capable of being applied to different types and variants of weaving machines. The electrical connection of the feeders to one another and to the controlling or supervising system of the weaving machine has hitherto been brought about in a different manner for each connection case. In a system having units in nets and located at the yarn feed elements it is a wish to integrate the functions of the feed elements and the machine. The integration then is to allow development of the one function independent of the other.

The weaving machine and feed elements represent a large number of functions which on the one hand have to be capable of being individually controlled and supervised and on the other hand have to be mutually interrelated to achieve an optimum functioning of the weaving machine. This means that the supervising and/or controlling system must be able to work rapidly and functionally reliably with e.g. short reaction times for yarn breaks, faults in the weaving pattern etc.

The use of a computerized system opens up the possibility of storing a large amount of information which can be used for the control and the supervision of elements/the machine. Signal-processing units, transmitters and drive units can be used in large numbers. A large range of different variants and solutions is offered to clients who wish to adapt their machinery according to the case selected for the occasion, which means that solutions which permit simple modifications of existing equipment are attractive.

Considering the large amount of information and the requirement for accuracy of the information, the transmission in the computerized system must take place accurately and with such speed that events which have occurred in the system are detected sufficiently rapidly in the places where the events which have occurred are to be acted upon in some respect. For each transmission case, the principle which applies is that a sequence of events is to be carried out. This sequence must in general be synchronized in some way, which can be achieved with the aid of, on the one hand, a run initiation signal (trigger signal) which gives rise to a certain sequence being carried out in the system, and, on the other, an acknowledgement signal which issues acknowledgement that an effected sequence is performed. In certain cases, an acknowledgement signal can be such that it directly initiates a new run. Alternatively, acknowledgements can be collected at a suitable place in the system in order to initiate a new run, taking as a starting point these together with some other criterion.

There is also a requirement to optimize the weaving function in the weaving machine so that even rapid weaving runs have gentle effects or stress on different parts in the weaving machine and/or feed elements. This means, inter alia, that actions, e.g. activations and stops, of certain parts and elements are to be capable of being prepared in advance so that sudden accelerations and decelerations are avoided or high speeds can be avoided.

It is also of great interest to anticipate and measure, in a rapid, effective and supervisory manner, the yarn consumption, which in individual cases is desired to be optimum with the least possible waste.

SUMMARY OF THE INVENTION

The aim of the present invention is to propose an arrangement which solves one or more of the problems indicated above.

An arrangement according to the invention can be considered to be characterized principally, inter alia, in that, on the basis of the programmed or stored weaving pattern or part of the weaving pattern, the control element ascertains the coming yarn/weft winding-on requirement. In the event of a yarn/weft winding-on requirement, which in the absence of the arrangement would cause greater acceleration and/or greater speed and/or greater deceleration of the yarn/weft in its winding-on by the feed element, a control action, which emanates from the control element depending upon said ascertained coming yarn/weft winding-on requirement, proceeds in advance to the yarn/weft winding-on speed controlling element of the feed element. That is to say before its yarn/weft consumption actually starts from each feed element, in order to prevent said acceleration/speed/deceleration of the yarn/weft from exceeding a predetermined value.

The units of the feeder comprise communication control parts with connection interfaces to, on the one hand, the connection, preferably two-wire, which functions as a data bus connection, and, on the other, microcomputers or equivalent which are divided up for control or supervision of the functions of the feeders. The serial bit flow effected by the communication control parts/the units at the serial connection proceeds in the form of messages which respectively comprise a frame and data part. Said frames comprise bits which are divided up for the transmission and reception functions of the system, e.g. for synchronization, encoding etc.

In a further embodiment, the units/the communication control parts are responsive to one or more predetermined markings or addresses in said messages/frames. In the event of massages/frames intended for a given feed element, this receives and stores the message for action depending upon the content of the message.

The units can also work with a feedback function. Each unit can take care of the control function for the associated feeder which can thus be provided with or interact with one or more transmitters which feedback stepwise or continuously a parameter change caused within the control function, e.g. change in movement, state etc.

In a further embodiment, at the two-wire connection, information is effected from one unit to another unit, or from the control element (the main computer) which preferably forms part of the electronic system/computer system of the weaving machine. Said information can relate to control information or activation information, which in turn selects or initiates stored control information in the unit concerned, e.g. in its second microcomputer. With the aid of said control information the unit effects control action/control actions of associated feed elements. The control action/control actions can relate to a first control of the motor of the feed element depending upon a weaving pattern which is programmed or selected in the electronic system/computer system of the weaving machine. Each control action can also relate to a second control of the motor of the feed element in relation to the motor/motors of other feedwheel elements. Alternatively or complementarily, there may be a third such control of the motor of the feed element, where preparatory acceleration and/or deceleration runs for the motor and part/parts influenced by it can be effected in advance so that the motor/the part/the parts are assigned their essential speed of motion before they come into operation for execution of an actual part of the functioning of the feed element in the weaving machine. Said runs can also be controlled so that exceeding the maximum speed or overspeeding can be prevented in the motor/the part/the parts.

The above proposals provide particulars relating to an effective integration and simple connection of the electronic control of the feed elements in or on the textile machine or to the supervising control system of the textile machine. The communications between the different functional parts in the textile machine or feed elements can be carried out rapidly and reliably. Units which work together can be connected and exchanged in the system without extensive reconnection or reprogramming. Thus, e.g. the feeder/system can be connected easily and unambiguously to the weaving machine.

The present invention also has in mind an arrangement to effectively control a yarn feeder in a textile machine. This control can be used in association with the above computerized system, but can also be used separately, that is to say the invention can advantageously, but not exclusively, utilize the system according to the present invention. In this context, a system is intended comprising two or more yarn feeders for textile machines, weaving machines for weaving of free pattern being intended in particular. So-called multicolor weaving can be cited as an example. With the aid of variable speed control of the yarn winding-on element of each feeder, it can be ensured, according to the invention, that all feeders procure themselves a yarn stock from a yarn supply assigned to each feeder. Said yarn stock permits at every moment a yarn consumption from each feeder which is determined by a weaving pattern which is representative of the operating case in question and is programmed or stored in a control element assigned to the feeder system. On the basis of the programmed or stored weaving pattern, or part of the weaving pattern, the control element ascertains the coming yarn winding-on requirement. This ascertainment can be achieved depending upon possible sensing or measurement of the existing yarn stock on each feeder. In the event of a yarn winding-on requirement, which in the absence of the arrangement would cause a greater acceleration and/or greater speed and/or greater deceleration of the yarn in its winding-on the feeder, a control action, which emanates from the control element depending upon said ascertained coming yarn winding-on requirement, proceeds in advance to the yarn winding-on speed-controlling element of the feeder. By these means, said acceleration/speed/deceleration of the yarn is prevented from exceeding a predetermined value. By these means, considerable advantages are achieved because the best possible constant speed leads to the minimum loss in the yarn feeder. No unnecessary stresses occur in the yarn or rotating parts of the feeder.

A further arrangement which advantageously, but not exclusively, can be included in the system described above consists of a limiting arrangement for the maximum speed of the yarn feeder. In this case, all devices are connected to a textile machine and provide information regardless the yarn consumption to a central unit which is utilized on the weaving machine. the central unit adds the reported yarn consumptions and on the basis of this calculates the maximum yarn consumption. Since it can be assumed that during one pattern report no feeder/device can have a higher consumption than the total consumption, the latter can be used as a maximum value limit and transmitted back to all devices.

The advantage with this system is that the maximum speed can be a rapidly reduced on all devices/feeders. The reduction can be carried out automatically after mains operation and without communication with the weaving machine, that is to say the feeders represent a separate system in relation to the weaving machine. As the stress on the yarn is speed-dependent, it is important that the maximum speed of the motor is kept as low as possible during a transient process.

In one embodiment, the devices/feeders can obtain their address by means of their location in the transformer box. The device which occupies position 1 is supervising/the master and questions the devices/the units 2, 3, 4 etc. When no answer is received, it can be assumed that no device is connected. The prerequisite for the latter function is that a control is connected in position 1. Controls in positions other than 1 transmit only upon request from the control in position 1.

BRIEF DESCRIPTION OF THE DRAWINGS

Embodiments of arrangements which display the features characteristic of the invention are described below with simultaneous reference to the attached drawings in which:

FIG. 1 shows in the form of a skeleton diagram a weaving machine with a system for control and supervision, to which a system for control and supervision of the feeders of the weaving machine is connectable via a digital connection for serial communication transmission, which serves as a data bus connection, FIG. 2 shows in principle the construction of a first type of message/frame which has priority over a second type or types of message/frame at the digital connection, FIG. 3 shows in principle the construction of another FIG. 4 shows, in the form of a block diagram, connection of two units to the connection, FIG. 4a shows, in diagram form, the signal train for the unit of FIG. 4, FIGS. 5, 6 and 7 show, in diagram form, signal trains, attributable to three different units, in association with prioritization when the units simultaneously require access to the connection, FIG. 8 shows, in the form of a block diagram, different constructions of units.

DESCRIPTION OF PREFERRED EMBODIMENTS

Figure 9:
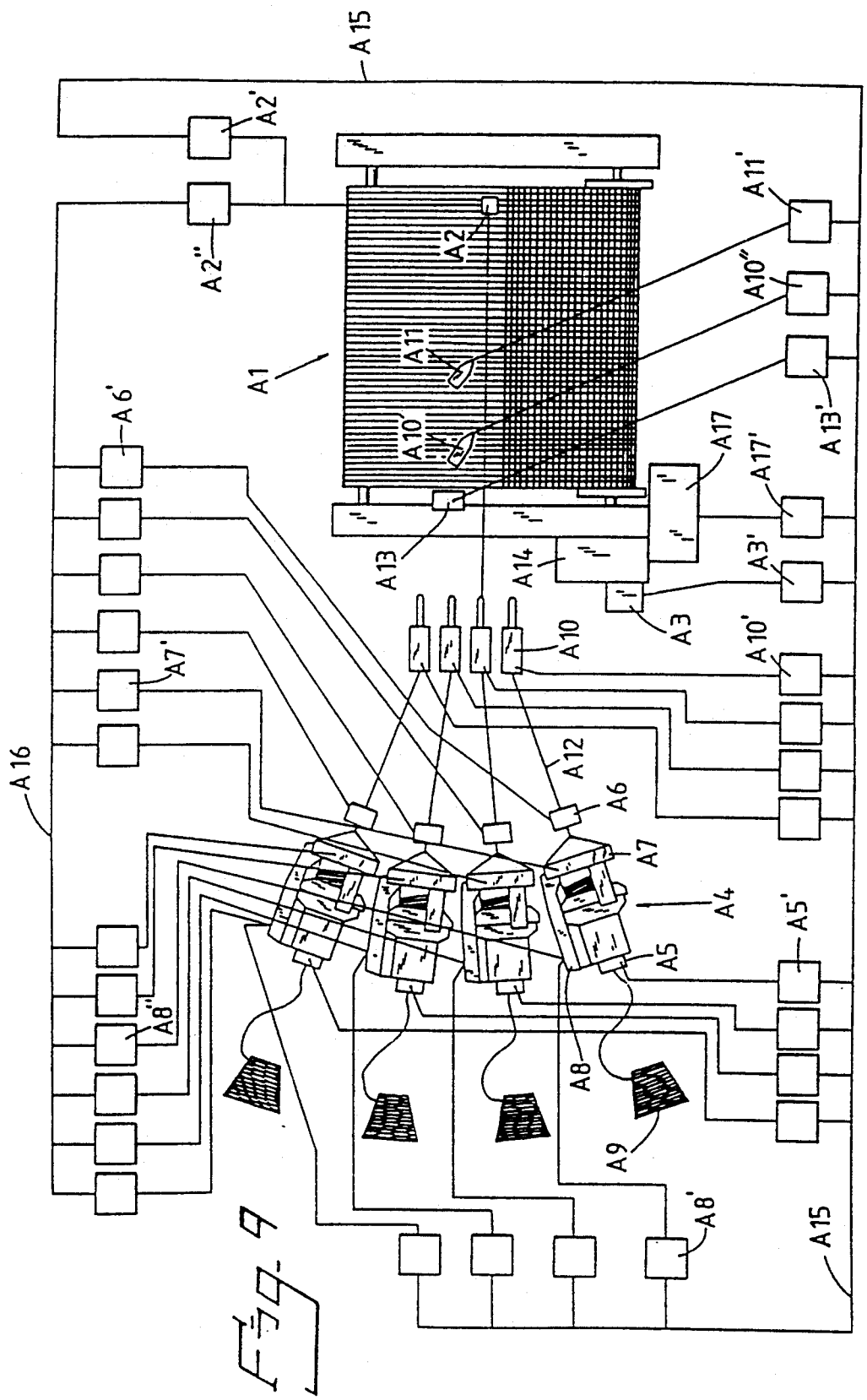
FIG. 9 shows in principle, and in the form of a block diagram, the connection of weaving machine functions comprising feeder functions served by computer system.

In FIG. 1, the reference number 1 represents a textile machine of optional type, e.g. weaving machine, knitting machine, shuttle machine, jet machine etc. The machine is of the type which is provided with a supervising electronic system/computer system 2, by means of which the different functions of the machine are controllable and supervisable. The connections of the system 2 to the machine have been symbolized with 3 and the connections of the machine to the system 2 with 4. The control and the supervision can take place in known manner and are therefore not described in greater detail here.

Feeders 5, 6, 7 and 8 are connected or connectable to the weaving machine. The feeders can also be of known type and are therefore not described in detail here. Thus, e.g. yarn magazines have not been shown for sake of clarity.

Each feeder has electrical connection parts 5a, 6a, 7a and 8a respectively, e.g. electromechanical parts. Each feeder is assigned a function control unit 9, 10, 11 and 12 respectively. In a preferred embodiment, each control unit is physically located close to or on each feeder. Each control unit comprises one or more first microcomputers or advanced digital circuits 13, 14 for serial interface control and serial bit flow processing. Memory circuit 15 (RAM, ROM) and a clock circuit 16 are also included. In addition, there can also be circuits for time logic, fault processing etc. In the figure, a communication port has also been shown with 17, via which port read-in and read-out elements can be connected via connections 18 for entering and retrieval of information, for programming etc. Each unit comprises or is connected to a second microcomputer 19 which effects the action, supervision etc. of the respective feeder. By means of the second micro-computer, calculations can be carried out for optimum control and supervision of each feeder via the connection 20. The second microcomputer comprises conventional peripherals such as memory circuits 21, communication circuits 22 etc. The connection interface comprises A/D and D/A circuits, communication terminals, pulse output etc. The second micro-computer 19 can be integrated in the unit 9 or alternatively constitute a separate unit, of the connection of the second micro-computer 23 to a separate communication control part 24 which has a corresponding construction to that described for the unit 9, apart from the second micro-computer 19 with associated peripherals 21, 22. The parts 23, 24 communicate with one another via a connection interface 25 for parallel communication. The units 9-12 can be constructed with identical, or essentially identical, connection interfaces so that individual interchangeability exists among the units, that is to say any unit can take the place of another unit, at least after a minor adjustment. In cases where a separate communication control part 24 exists in all units, these can be made individually interchangeable in corresponding manner.

Each unit 9-12 is arranged connectably to a two-wire connection 26, 27 for serial communication or message transmission. The system 2 is also connectable to the connection 26, 27. The system 2 can comprise one or more control computers 28 which can function as supervising computer or computers for the units 9-12 which, in interaction with the respective control computer, function as slaves. In one embodiment the units 9-12 are complementarily or alternatively arranged for reciprocal communication. Two-way or one-way exchanges of messages/pieces of information between the control computer/the control computers and the units or between the units is symbolized with arrows 29-38. Further connection(s) serving further units can be connected to the weaving loom computer system 2. The different computer systems can work in parallel or with a supervising and subordinate system. One or more units can thus be provided with more than one part 13, and each part 13 is connected to its part system or its loop (connection) which affects the unit in question. Two units which are connected via a connection, e.g. the main connection, can carry out internal communication with one another via the connection or the main connection, which internal communication is not involved in other communication at the connection (the main communication).

The respective connection of units and/or control elements to the digital connection 26, 27, which serves as a data bus, takes place via connection elements, e.g. terminal elements 39 which, for each unit/control element, have a pair of screws, via which the connection to the unit/control element or the connection 26, 27 takes place. Message exchange can take place with messages of different types. The bit flow, which is effected between the units or between the units and the control element(s), in the digital data bus is arranged in said messages which respectively comprise a frame part and a data part (applies to one type of message). The messages/the frames can be executed with markings or addresses intended for the units. Each unit receives and stores its addresses which are assigned in the system/the systems. Alternatively, the system/the systems can operate with a certain order for the units. In the event that the units are controlled from a supervising computer 28, the system can work with a start-up phase, in which control information is issued for selection of feeder functions, e.g. depending upon a programmed or selected weaving pattern, and a working phase in which the selected feeder function or functions are diagnosed, supervised, controlled for optimum function performance etc., and effected. Thus, e.g. the yarn quantity can be measured, the thread tension supervised etc. The reciprocal message transmission between the units makes it possible for the functions of the feeders to be related to one another, e.g. speed-adapted depending upon the type of weaving machine, possible yarn breaks etc.

The feeders can work with a feedback function/feedback functions where the system makes it possible for the feeders to utilize the same transmitter. The locking element function for the yarn measurement, retention and winding-off from the feeder drum can also be controlled.

Two or more message types can be utilized, one message type being given priority over other message types at the digital serial connection. FIG. 2 shows a construction of a first type of message which in principle consists only of a frame part (system part) which has the same length as the message 40, the length of which is indicated with L. The message or the frame is constructed of different fields. A start field is indicated with 40a, a priority field with 40b, a control bit field with 40c, a total control field with 40d, and finally an acknowledgement and completion field with 40e and 40f respectively. The content in the priority field determines the ranking of the message from the point of view of priority. In one embodiment, all messages appearing at the connection are mutually ranked, instantaneous signals or trigger signals being attributed the highest priority and normal communication then having priority according to the time requirement. Pick signals, yarn break signals, arrival signals, feeder exchange signal etc. have the highest priorities, while transmission of information regarding the long-term functional working in the textile machine has lower priority.

The second message type 41 according to FIG. 3 has, in principle, the same construction as the message type according to FIG. 2. The difference lies in the fact that the message in FIG. 3 also comprises a data field 41a. The frame part in message 41 according to FIG. 3 can be thought of as consisting of the parts 41b and 41c. The data field contains information which is to be transmitted between the units.

The communication transmission works bit-synchronously, which is of significance, inter alia, in priority selection. The messages are assigned relatively short lengths L and L'. In this manner, a message of lower ranking does not obstruct a message of higher ranking for any length of time in the event of transmission of the latter message taking place when a unit with a higher ranked message wishes access to the connection. The message length L' can be selected in the order of magnitude 0.05–0.1 ms (at 1 Mbit/sec). The distances a, a' and b respectively are selected with great accuracy. In order to carry out the functional working in the textile machine, bit speeds of e.g. 1 Mbit/sec or higher, e.g. 4 Mbit/sec, are utilized.

A basic feature of one type of transmission may be that two different types of logic levels are to be used, the first level here being called dominant level and consisting of "0" and the second level consisting of a non-dominant level "1".

By using said two levels, prioritization and fault detection are made possible. The hardware in the system is designed so that if one or more transmitters transmit a dominant bit or level, this will be received in the communication, irrespective of how many are transmitting a non-dominant bit or level. As a bit fault in the communication appears in all connected communication unit (units), 100% of all faults which have occurred are detected. This is based upon the fact that the transmitting unit sees that faults occur when the bit emerges in the communication. For faults which have occurred locally (that is to say faults which only occur in the receiving unit) the following conditions apply. If more than five bits are faults, detection of the fault takes place to 100% and this applies irrespective of how these five faults are spread in the message. A second condition is that if the number of faulty bits is odd, detection always takes place. As for the remaining types of faults (2 or 4 faulty bits), these are detected with a probability of 1/33000. The transmission of a bit is effected by means of the transmitted bit being divided up into five parts. The first part is a synchronizing part which normally starts the bit. The second part consists of an increase part (time increase part), with which the bit is increased in the event of resynchronization. A third part relates to a first delay part which is attributable to a time interval, during which a stable level is obtained. At the end of this time, the value of the bit is read off. The fourth part consists of a second delay part, which forms a time interval in order that the circuit may determine internally whether it is the current unit which is to transmit the coming bit and which bit is to be transmitted in such a case. The fifth part is attributable to a reduction part which can be removed in the event of resynchronization. In cases where the communication part concerned cannot work entirely alone, it can be complemented with a microprocessor.

In one embodiment of the invention, all units which want to have access to the connection start to transmit their message as soon as there is a free space at the connection. The different messages have different priority, which means that all messages with lower priority are interrupted and only the message with the highest priority comes to be completed. All those connected to the connection can, however, read the transmitted message. All units are adjusted or arranged to receive an assigned message and pick it up and, depending upon the message, carry out the function in question or pick up an actual piece of information. Acknowledgement can take place in different ways. A receiving unit can e.g. transmit an acknowledgement bit when it considers it has received a correct message. Another possibility is that the receiving unit answers by means of transmitting a message back depending upon a received message. The receiver can alternatively transmit a special acknowledgement message.

By means of the prioritization function proposed according to the invention, the transmission of a large amount of information between the units is made possible. The transmission consists of an asynchronous process which has to be carried out serially in time. The units do not then receive knowledge in advance of the message transmission happening. The system therefore has to work so that collisions between two different messages are prevented. According to the invention, it is proposed in one embodiment that prioritization takes place in the transmitted message, which means that any unit can transmit to any unit without problems. In addition to the system thus working with two logic levels, all connected units must be capable of detecting within a fixed time when a unit starts to transmit. By this means, it is ensured that the digital levels in the communication can be made stable at the moment when the units are reading off the bit from the communication. Another requirement in a system of this category is that each unit must interrupt its transmission as soon as it detects that the transmission comprises a message with a dominant bit when the unit itself is transmitting a non-dominant bit. Further action can be taken to ensure that a unit with high priority does not fail to transmit. In normal cases, the transmitting units start their transmission in a random manner in time, which makes it extremely improbable that two units start to transmit simultaneously (they have to happen to start the transmission within the same 100-300 ns at a bit frequency of 1 MHz). In the event of transmission taking place simultaneously within this time, the selection is made by means of prioritization. The problem arises when the transmitting unit cannot transmit because the connection is occupied. When the connection becomes free, the probability is very high that there will be several messages waiting in turn to transmit. When the network becomes free, all those which are waiting in the queue can start their transmissions, in which case there is also the requirement that when a message is completed, all units which wish to transmit must start their transmissions in an interval which is approximately 10% of the bit period, which means that all units must start their transmission within the same 100-300 ns at a bit frequency of 1 MHz. This latter requirement is prescribed preferably in order that a unit with low priority does not start transmitting somewhat earlier than one with high priority and thus create an occupied connection. The above can, however, be used for prioritization. A manner of ordering priority is thus that after a completed message, the units receive different delays before they can start the transmission. The unit which has the highest priority has a short waiting time and those with low priority have to wait a long time before they can transmit.

The waiting time with normal use of the connection with a maximum transmission speed can be 148 μs (2×111 bits) plus the time it takes for the processor to process the information with its program. The minimum transmission time is half of the maximum. By means of only allowing, at sensitive moments, transmission of messages without data, this time can be reduced to 62 μs. All these calculations are made with a bit frequency of 1.5 Mbit/sec and on the assumption that the transmitted message has the highest priority. The circuit has the possibility of interrupting a transmission by transmitting a fault frame, which is transmitted automatically when faults are discovered in the communication and/all units interrupt the reading-in and disregard all information read in. By transmitting such a signal, the message in progress can be interrupted and an important message can be transmitted directly afterwards. This should reduce the response time to a maximum of 44 and a minimum of 40 μs.

For messages which comprises a predetermined number of bits with the same level in succession, the transmission (the protocol) works with a bit which is inverse and follows the predetermined number (e.g. 5). The inverse bit can optionally be selected to form part of the message or not. Interference is thus prevented from locking the connection. Otherwise it would be possible for cases to arise in which the interference was repeated and the system went out of order. In the event of faults, all units transmit e.g. six dominant bits in succession as a sign that they have preceived the fault. All units then transmit e.g. six non-dominant bits. With this, the communication is restored and each unit is ready to or can start transmitting. Each unit which received the faulty message discards it and the unit which sent the message from the start resends. By these means, speeding up of alarm messages is brought about.

FIG. 4 shows the connection in principle of three units 42, 43 and 44 to the connection 26'. The following table shows how the priority selection is arranged in a first example. The construction of the priority field in the respective message for the respective unit 42-44 can be seen in the table. The message of the unit 44 has most dominant bits (levels) and is selected before the messages of the units 42 and 43.

|  | priority field | unit |
|---|---|---|
| Transmitted: | 1000 0000B | 42 |
|  | 0010 0000B | 43 |
|  | 0000 1111B | 44 |
| Result: | 0000 1111B | 44 |

43 has transmitted 1 but received 0 and stopped its transmission 42 has transmitted 1 but received 0 and stopped its transmission.

FIG. 4 shows that the unit transmits its respective bits and reads the levels (that is to say, transmits and reads simultaneously) which are received on the common communication line.

FIG. 4a shows the case according to the table shown above where prioritization takes place in one part of the message. In the figure, a "1" indicates a non-dominant level/transmission and a "0" a low level/dominant transmission. The transmission at the respective connection must be so rapid that when the respective bit is read off by the receivers/ the units, all the transmitted bits must have reached the respective reveiver. B1, B2, etc. to B8 indicate respectively a bit space. When the unit 42 compares the transmitted bit in the space B1 with the state received in the communication, the unit notes that the non-dominant bit has been overwritten by a dominant one. The unit therefore interrupts its transmission. This must take place since continued transmission of the bits of the unit would have rendered impossible the prioritization by means of overwriting of the dominant bits of the unit. At the bit space B3 the unit 43 makes the same observation of the difference between the transmitted bit value and that which the unit sees in the communication, for which reason the transmission is interrupted. At bit space B8 the unit 44 notes that it had the highest priority since it never had to interrupt its transmission. The unit 44 consequently completes the message. The transmission (the message) can of course consist of both ones and zeros even though only zeros are shown in the examplary embodiment. In the example described, the prioritization process takes place with the aid of eight bits. It is of course possible to use more or fewer bits.

FIG. 5 shows an alternative case with collision detection known per se. The units 42', 43' and 44' are assigned different waiting times Δt, Δt' and Δt" after collision. The unit (42') which is assigned the longest waiting time (Δt") receives priority at the connection, whereas the other unit(s) must thus wait for their respective transmission.

FIG. 5 also shows the signals which occur in a system in which three transmitters/units collide in their attempts to transmit simultaneously. The units/the connection are normally executed so that no unit starts its transmission when another unit is transmitting. In the event of a simultaneous start, however, there is a slight risk of a respective unit not managing to detect that another is transmitting simultaneously. After a moment or a shorter time interval, the transmitting units/circuits come to indicate that their transmission is colliding with another transmitter. When a transmitting unit detects this, it goes into a fault detecting phase in order to complete the message and indicate to other units that the transmission has collided. The completion is carried out in such a manner that all units involved transmit a sequence of dominant bits which overlap one another so that by these means a clear and marked completion of the collision can be detected by all units which are all synchronized to the edge in question. From a time KA, all units wait a predetermined time and the unit with the highest priority waits the shortest time before the unit starts to transmit. The units with lower priority wait a longer time and, when the time comes at which the latter units are to start to transmit, they indicate that the connection is occupied, for which reason the units concerned have to wait until the communication becomes free.

FIG. 6 shows a further alternative concerning mechanically guided collision in which dominant levels are first transmitted in order to make clear that the unit(s) wish to transmit. The units 42", 43" and 44" are assigned different wait times vt1, vt2 and vt3 after all units have finished transmitting dominant bits. The unit (42") with the shortest wait time (vt1) thus gains priority to the connection. The edges of the pulse trains must be kept to the time t1 with great accuracy (e.g. 100 nanosec).

The case according to FIG. 6 is almost identical with the case according to FIG. 5. The functions differ in that the units in the case according to FIG. 6 do not start to transmit any message without starting by transmitting the sequence which in the case according to FIG. 5 indicates a collision. A collision is thus signalled irrespective of whether any other unit is transmitting or not. The prioritization otherwise takes place in the same manner as in the case according to FIG. 5. the advantage with the method according to FIG. 6 is that the delay is constant and the collision indication does not need to be carried out. The disadvantage in relation to the case according to FIG. 5 is that the prioritization takes a certain time even if there is only one unit which is to transmit.

FIG. 7 shows a fourth example of priority selection for the units 42''', 43''' and 44'''. In this case, the starting point is the number of bits BA, BA' and BA" or times T1, T2 and T3 respectively in the respective message. The message for the unit (44''') with the greatest number (BA") receives the transmission state.

In this solution, it is the start sequence itself which is used for the prioritization. In this case, the length of the start sequence varies and that which has the longest start sequence and is the last to stop with its start sequence has the highest priority. After the prioritization, a certain time TU is used up for the unit to clarify that it is itself which is to transmit. The different prioritization times T1, T2 and T3 must be so different in length that they can never be mixed up with one another. There is in this case a degree of uncertainty in time, between the time a transmitter starts to transmit until the start edge concerned is detected by other units.

FIG. 8 shows examples of units 45 and 46 of different types, the unit 45 being highly intelligent and the unit 46 being of a simpler type. The unit 45 has a microcomputer 47 which is connected to or comprises memory areas 48, 49, e.g. in the form of RAM or ROM memory respectively. The micro-computer 47 works into a connection interface 50 which comprises D/A and A/D converters. Also included are counters, pulse outputs and pulse inputs. The connection interface 50 can also be provided with a communication terminal 51. The connection interface works into an electromechanical part 52 belonging to an actual element in the textile machine. The microcomputer 47 also works into a communication part 53 which can comprise one or more micro-computers, advanced circuits etc. A circuit 54 which in particular configures the unit 45 can be included. Said circuit 54 is provided with inputs and outputs 55. The unit 45 is connected via an output 46 to the digital connection 26". The unit 46 can consist of a communication part 57 which is connected to one or more transmitter elements 58 and one or more indication elements 59 and/or execution elements 59'. The unit 46 has an output 60 which is connectable to the connection 26'.

FIG. 9 shows symbolically an airjet weaving machine A1. The machine is provided with arrival detectors A2 and reference transmitters A3 for the machine angle. A number (4) of feeders A4 belong to the machine. Each feeder is provided with inward and outward thread monitors A5 and A6. A thread measuring device A7 and motor control elements A8 are also included. The respective yarn stock is indicated with A9. Each feeder is assigned a main nozzle A10 and relay nozzles are indicated with A10' and A11 and the thread with A12. Cutting elements A13 are also included. The drive element of the weaving loom is symbolized with A14.

The machine is controlled and supervised by two computerized systems according to the above. The serial digital connections in each system are indicated with A15 and A16 respectively. The computerized or electronic control system of the weaving loom is indicated with A17.

Said elements forming part of the weaving machine are connected to the respective connection via units according to the above. The units have the same reference indications as their associated elements, but completed with primes. Only the units whose elements are provided with reference indications are marked with the corresponding references. Similar elements (e.g. main nozzles for each feedwheel) each have their own unit in the figure, but elements can share the same unit or be connected in pairs to the same unit. Other units (cf motor control elements A8) can on the other hand be connected to two units A8', A8" which each belong to or are connected to their own of the two computerized systems. The control unit A17 of the machine is connected via the unit A17' and the call monitor A2 is connected to both systems via the units A2' and A2".

The equipment according to FIG. 9 works with a start-up phase and an operation phase. For the start-up, each feeder has e.g. been assigned an identification number in the system. This allocation can take place by means of a code being received in the terminal contact. The start-up phase in the system can be characterized by the following description. The respective feeder reads off its identification code via the communication transmission effected at the respective connection from a supervising unit in the system. The weaving machine informs the system of its breadth and working speed. The weaving machine further informs the respective feeder of the coming pick sequence number, e.g. 16, for the machine speeds most closely corresponding to the number. The weaving machine also informs the respective feeder of how much time will run after the reference signal before the feeder releases the thread. The respective feeder prepares itself with the aid of this information by taking up an optimum thread stock and adjusting itself to optimum maximum speed.

The operation phase is started by the weaving machine giving a start signal to the system(s). Every time the reference transmitter A3 is passed, a reference signal is issued. The feeder whose turn it is to release thread, counts down the time until the release time. When the latter is reached, the feeder releases the thread. The feeder also measures the thread and activates its stop element at the right moment. The arrival monitor A2 gives a message when the thread passes. Thereafter, the sequence is repeated, reckoned from the reference signal of the reference transmitter. The repetition depends upon the length of the sequence. In one embodiment, the sequence can be repeated a further seven times. Thereafter, the weaving machine gives a pick sequence of a number of picks, e.g. eight picks, which are to come after the remaining picks, in this case eight picks, which have already been given. Once again the sequence is repeated from the stage at which a reference signal is received when the reference transmitter A3 is passed. In the described operation phase, different types of messages according to FIGS. 2 and 3 are thus called for. The start signal of the weaving machine is a typical instantaneous signal/trigger signal. The signals from the reference transmitter, the activation signals of the feeders for the stop elements, and the signals from the arrival monitor are typical instantaneous signals. These signals have, according to the above, priority in the communication transmission system over messages which contain data parts. An example of this message type is speed information and other messages which are to go to the respective feeder. These messages can be stored in memory stacks which work on the first-in-first-out principle. The yarn quantity e.g. can be directly received in these messages.

An alternative embodiment of a functioning principle which can be utilized on the weaving machine according to FIG. 9 starts out from the fact that the system is equipped with separate nozzle control which controls main and relay nozzles A10, A10' and A11 respectively. This nozzle control is thus connected to the same serial communication as the weaving machine and the feeders. The start-up stage is started by the respective feeder A4 reading off its identification code in communication transmission. The weaving machine indicates its breadth and its working speed. The weaving machine informs the respective feeder of the next pick sequence (e.g. 16) for the machine speeds most closely corresponding to the number (16). The respective feeder prepares itself with the aid of this information by taking up an optimum thread stock and adjusting itself to optimum maximum speed. The weaving machine (by means of its part A17) asks the respective feeder A4 how long after a release signal the feeder is to release the thread. The respective feeder informs the weaving machine of how long it takes from the release signal being received to the feeder releasing the thread. The weaving machine stores these values in order to be able in each operating case to calculate an optimum time for transmitting a release signal to the actual feeder. The weaving machine instructs the respective feeder to indicate every time a certain length, e.g. 7 cm, has been unreeled. This information is read off simultaneously by the nozzle control.

In this case also the operation phase is started by the weaving machine giving a start signal. The respective feeder calculates and executes optimum acceleration and speed sequences. The reference signal is given when the reference transmitter A3 is passed. The weaving machine calculates an optimum time for giving a release signal to the feeder which is to release thread and an optimum time for transmitting a message to the nozzle control to turn on the main nozzle. At the correct time, the weaving machine transmits a message for opening the main nozzle and a release signal to the actual feeder. The main nozzle is opened and immediately thereafter the feeder releases the thread. The feeder measures the thread and transmits a situation signal every time 7 cm of thread have been unreeled. Guided by this, the nozzle control calculates optimum times for opening and closing relay nozzles and closing off the main nozzle, in addition to which the nozzles are controlled according to this. The feeder calculates the correct time for activating its stop element and activates the stop element when the time comes. The arrival monitor A2 gives a message when the thread passes. Each element can, guided by the procedure, conclude whether the pick has been successful or not. If the pick is judged to be faulty, a message concerning this is transmitted. The weaving machine decides whether it is to stop or continue. The above sequence, reckoned from the respective feedwheel calculating and executing an optimum acceleration and speed sequence, is repeated a further 7 times. The weaving machine gives the pick sequence of eight picks which come after the remaining eight picks which have already been given. Repetition takes place again of the whole sequence from the phase in which the respective feeder calculates and executes an optimum acceleration and speed sequence.

For the cases described above, in the event of thread break before a feeder, the feeder in question transmits a message code (instantaneous signal) "thread break before feeder" and completes its pick. The weaving machine takes suitable action for the system. The feeder informs the system whether the pick has been completed or not. In the event of thread break after a feeder (A6), the feeder in question transmits a message code (instantaneous signal) "thread break after feeder". The weaving machine takes suitable action for the system.

Figure 10:
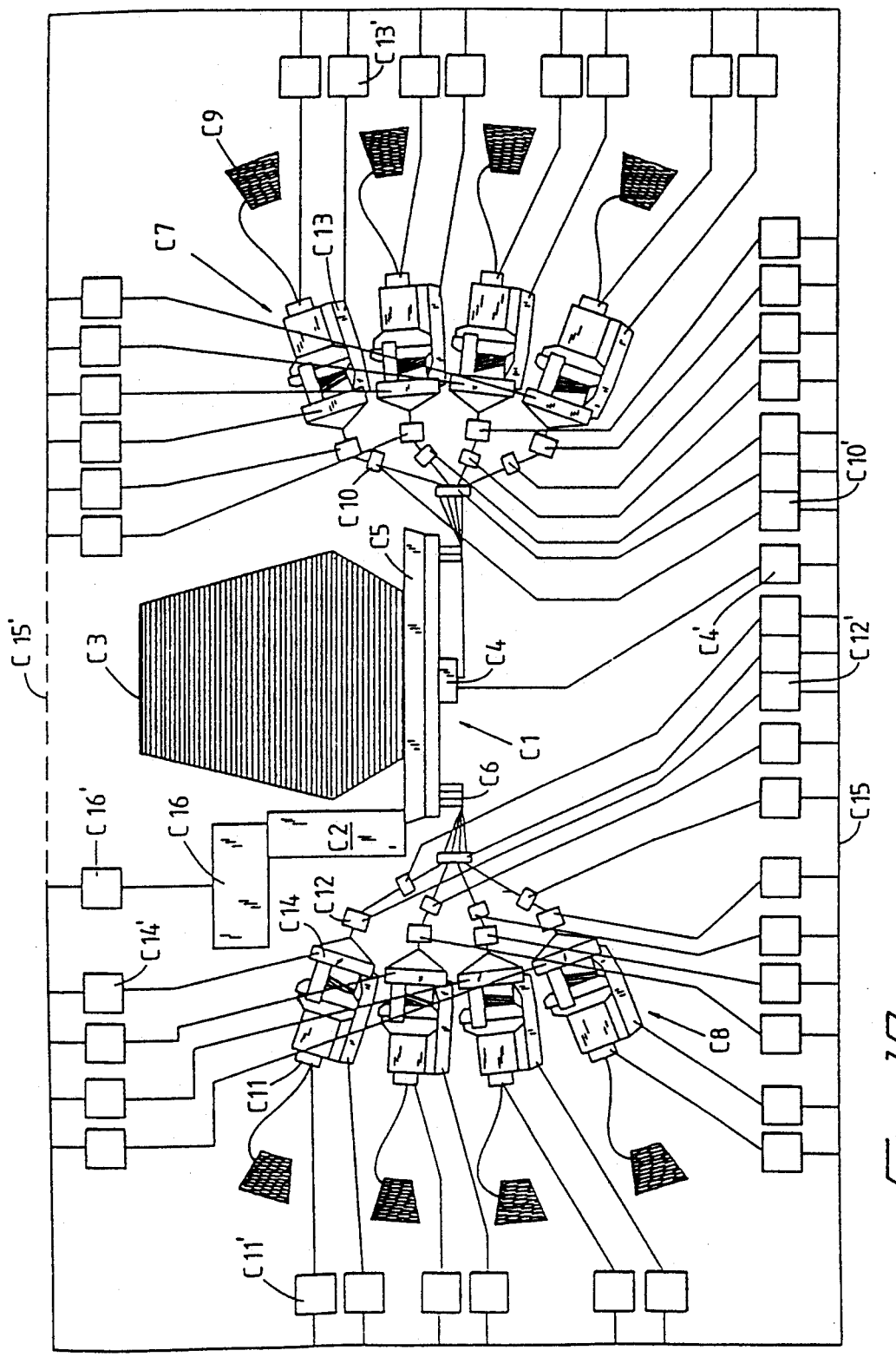
FIG. 10 shows, in the form of a skeleton diagram and a block diagram the connection of a computer system to a flat knitting machine.

FIG. 10 shows an example of a flat knitting machine C1 with associated computer system according to the above.

The machine comprises a drive pack C2, and a finished woven piece of fabric is shown with C3. The carriage of the machine has the reference C4, needle bed C5 and thread guide C6. Two groups of feeders are indicated with C7 and C8. The feeders are each fed from their own yarn stock C9. Each feeder is provided with a "positive" thread measuring device C10. Each feeder is provided with inward and outward thread monitors C11 and C12 respectively, a motor control element C13 and a thread measurement element C14.

The machine is controlled and supervised by a computerized system according to the above. The serial digital connection is shown with C15 and can be open or closed (via broken line C15'). The control unit of the machine is indicated with C16. The elements described above of the weaving machine are connected to the connection C15 via units according to the above. The units have the same reference indications as the elements, but have been completed with primes. Only the units whose elements are provided with reference indications are provided with corresponding indications. Similar elements (e.g. thread monitors) can have the same or different units.

In a flat knitting machine, the stroke length may be changed every machine cycle. The flat knitting machine consumes significantly more yarn when the yarn guide C6 moves away from the feeder than when it moves towards the feeder. For example, for a knitting breadth of 1 m, 5.5 m of yarn is consumed when the carriage moves away from the feeder and 4.5 m when the carriage moves towards the feeder. The system for the flat knitting machine also works with a start-up phase and an operation phase. In the start-up phase, the respective feeder reads off its identification number from the communication system. The knitting machine indicates the speed of the yarn guide C6 and whether the yarn guide is in the end position nearest the feeder or not. The knitting machine informs the respective feeder of those of the next strokes, e.g. the next 16 strokes, which are to supply yarn and what length or stroke respectively is to be given. The respective feeder calculates and stores the speed control for the coming number of picks, e.g. the coming 16 picks.

The knitting machine is then ready for the operation phase, which is started with a start signal. A reference signal is received when the carriage turns. Each feeder controls the yarn feed-out according to its sequence calculated for the current pick, if necessary corrected with information from a continuously measured yarn tension. The sequence from the time when the reference signal is received when the carriage turns is repeated a further predetermined number of times, e.g. 7 times. The knitting machine then gives each feeder the data required for the pick sequence of a number of picks, e.g. eight picks, which has already been given. Each feeder calculates during its idle time a suitable control sequence for the coming picks, in this case the coming eight picks. The whole is then repeated from the time when the reference signal is received when the carriage turns.

In the event of thread break before the feeder, an indication is received from the inward thread monitor C11. The feeder in question transmits a message code "thread break before feeder" and completes its pick. The flat knitting machine then takes suitable action for the system. The feeder in question indicates whether the pick has been completed or not. The flat knitting machine takes suitable action for the system. In the event of thread break after a feeder, the outward thread monitor C12 gives a warning. The feeder in question transmits a message code "thread break after feeder". The flat knitting machine takes suitable action for the system.

Figure 11:
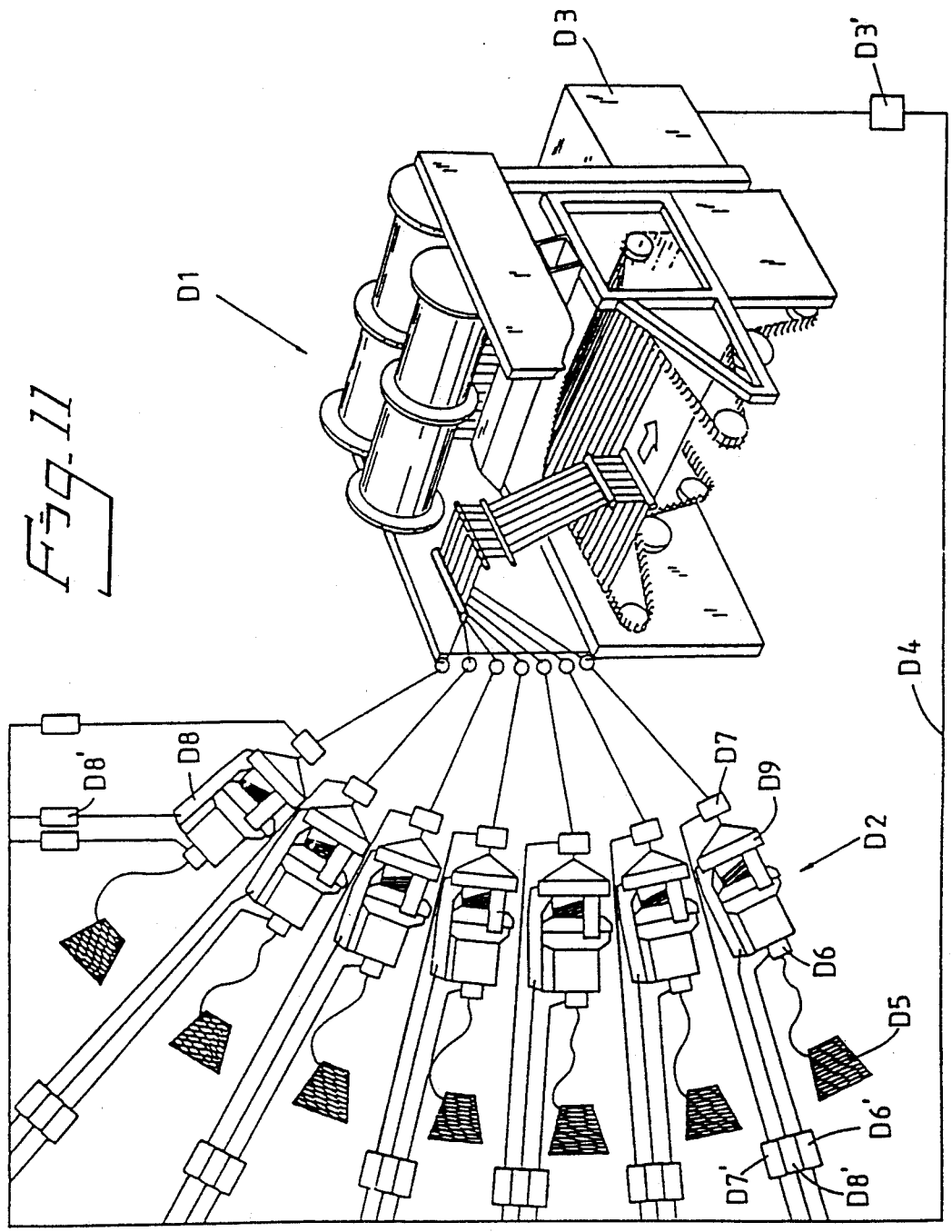
FIG. 11 shows, in perspective, the connection of the computer system to a KETTEN machine.

FIG. 11 shows an example of the application of the invention in warp-knitting machines or hosiery machines, e.g. in the form of a KETTEN machine. The machine is symbolized with D1 and its feed elements with D2. Ther machine is assumed to be known and will be described here only in connection with the use of the machine together with a computerized system according to the invention. The control computer/electronic control system of the machine is shown with D3. The serial and digital connection has the reference D4. The yarn stock of each feeder is shown with D5 and inward and outward thread monitors with D6 and D7 respectively. Motor control elements and thread measurement elements in each feeder are shown with D8 and D9 respectively. Said elements are connected to the connection D4 via units which have been given reference indications corresponding to the elements, but completed with primes. Only the units which serve the elements which have been given reference indications in the figure have received corresponding reference indications.

A warp machine has as in known one thread guide for each warp thread which lays the respective thread around or in selected needles. These thread guides are connected together with back guide bars which cause all thread guides in a thread system to move simultaneously. Usually there are two or more thread systems on a machine. The movements are controlled by a pattern wheel or a pattern drum. The principle is known and the movements in modern machines are very rapid. A thread layer sequence for laying one course can be carried out in 1/20th sec, in extreme cases in 1/40th sec. The hitherto known mechanical systems which are based on wheels or links have a shortcoming in that a change in the pattern requires exchange or modification of mechanical parts, which takes time and means that only a limited number of variants can be accessible.

Figure 12:
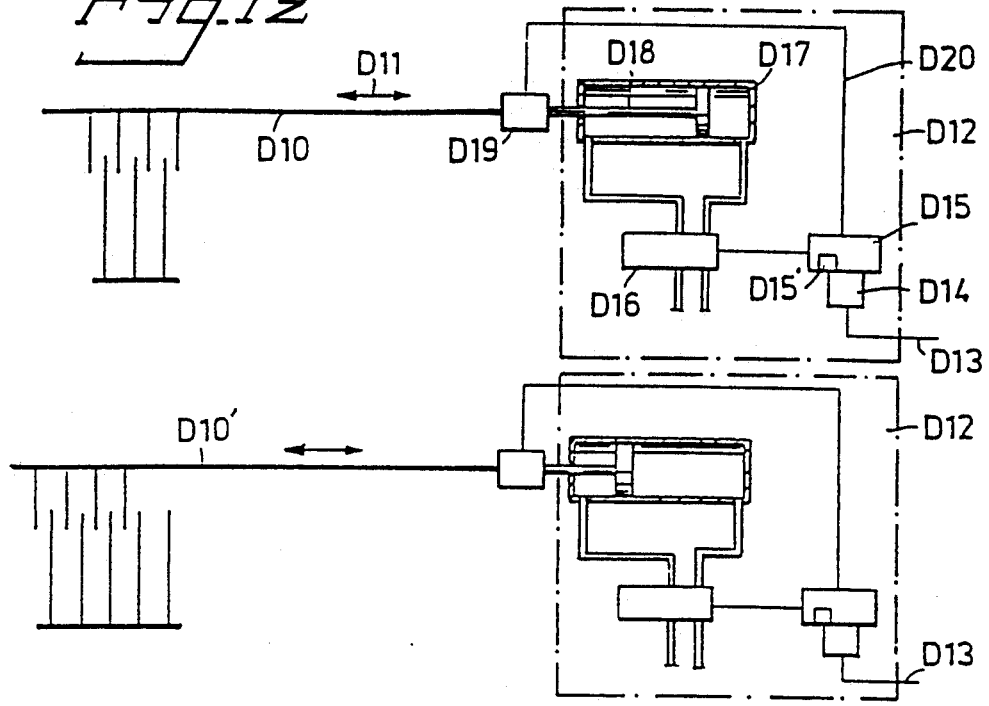
FIG. 12 shows, in the form of a block diagram and in principle, the construction of a unit.

According to the present invention, the possibility is afforded of controlling, in a simple manner, each back guide bar, cf D10, D10' in FIG. 12 which shows a back guide bar in two different functional positions. The back guide bar is displaceable in the directions of the arrow D11. In FIG. 12 a unit of the type referred to is shown with D12 and the serial and digital communication line with D13. The unit comprises in this case a communication unit or communication part D14, a control element D15 for an adjustment device, a servo valve D16 which is controlled by the control element D15, and a control cylinder D17 forming part of the servo valve. The piston D18 of the cylinder is sensed by a position indicator D19 which is fed back to the control element D15 via a feedback loop D20. The feedback can be continuous or stepwise, preferably with frequent steps (pulses).

According to the above, the control element has or is connected to a memory D15' and in this memory is stored the data which is required in order to give the movement pattern for the basic weaves it is desired to use. Examples of basic weaves are fringe, tricot, cloth, satin and velvet. These basic weaves each occur in the open or closed weave variants. A large number of basic weaves and variants of these are already known.

Figure 13:
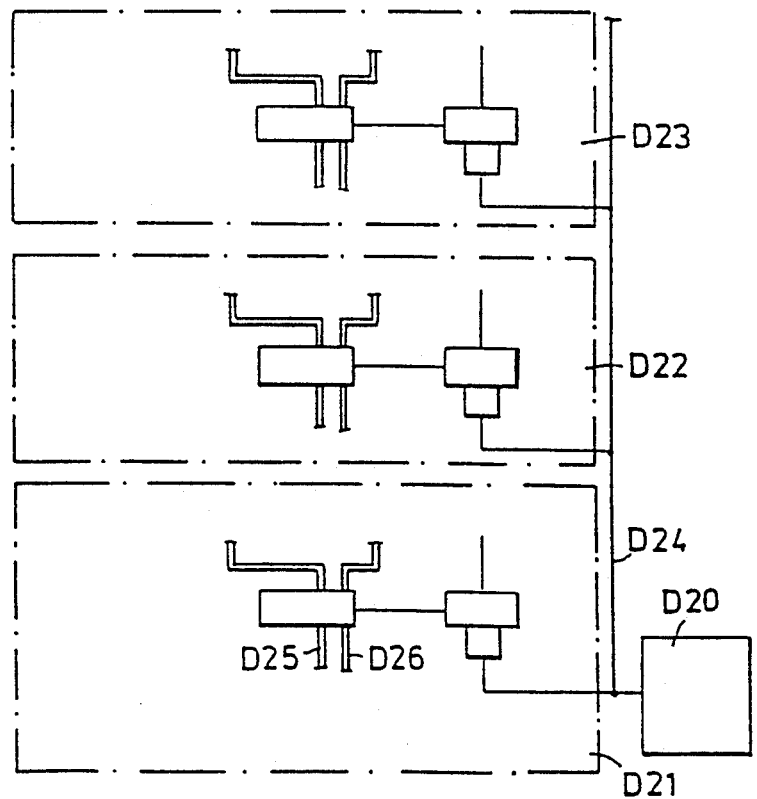
FIG. 13 shows, in the form of a block diagram and in principle, a number of units and execution elements according to FIG. 12 connected to a digital and serial connection.

Each back guide bar can be assigned its unit according to FIG. 13. The control unit D20 of the hosiery machine is like the units D21, D22, D23 etc. connected to the digital two-wire connection D24. Each unit has the basic construction shown in FIG. 12. The pressure and return lines of the servo varve are shown with D25 and D26 respectively. The connection of the control units of the back guide bars has been shown in separate figures for the sake of clarity. The hosiery machine works with a start-up phase and an operation phase. In a first embodiment, the control unit D20 of the hosiery machine transmits to each adjustment device/unit D21, D22, D23 data which the adjustment device requires in order to be able to effect the basic weaves which are to be used for the manufacture of the desired textile goods. The hosiery machine/control unit D20 further gives information regarding which basic weave each adjustment device/unit is to carry out during the next/coming stroke. The operation phase is started by the hosiery machine giving a start signal/instantaneous signal for the next stroke at a time chosen so that the back guide bars come to move in unison with other machine parts. The hosiery machine further gives information regarding which basic weave each adjustment device is to carry out during the stroke following the coming stroke. If any adjustment device fails in its sequence, this adjustment device gives a fault message. The above operation sequence is repeated.

Hosiery machines often interact with feeders when goods with weft inlays are being manufactured. As can be seen from the figure in question, these weft threads are laid in with a thread guide arrangement which gives i non-uniform thread consumption in the stroke. In order that each feeder is to be able to handle its thread in an optimum manner, the feeders must know the thread consumption pattern in every stroke and the variation of the stroke frequency during the next strokes. This information is known by the hosiery machine/the control unit D20.

A start-up phase for the above function is started by the hosiery machine transmitting to each feeder the data which each feeder requires in order to be able to determine the thread consumption during every stroke. The hosiery machine then gives data regarding the stroke frequency during the next strokes, for example the next eight strokes. The feeders adopt an optimum start position with regard to the size of the thread stock and motor control parameters.

In the subsequent operation phase, the hosiery machine gives a start signal/instantaneous signal and starts other machine parts. The hosiery machine gives a signal when the yarn guide reaches the respective turning position. Each feeder finely adjusts thread stock and speed. The above is repeated until the fourth stroke is begun. The hosiery machine transmits the necessary information regarding the four strokes which follow the next four strokes, whereupon the whole operation sequence is repeated again.

In the event of thread break before a feeder, the feeder in question transmits a message code "thread break before feeder" and completes its pick, whereupon the hosiery machine takes suitable action for the system. In the event of thread break after a feeder, the latter transmits a message code "thread break after feeder", at which the hosiery machine stops and takes suitable action for the system.

By means of the serial communication system described above, instead of controlling the shaft via a mechanical link system, cams or cam links, possibilities are opened up for using a hydraulic system, electric system etc. for the control, which means that the machines can be constructed more simply. Furthermore, patterns can be changed more rapidly and more simply. This applies particularly to multi-colour jet machines in which it is important that interaction takes place with a large number of units such as feeders, nozzles and shafts.

Figure 14:
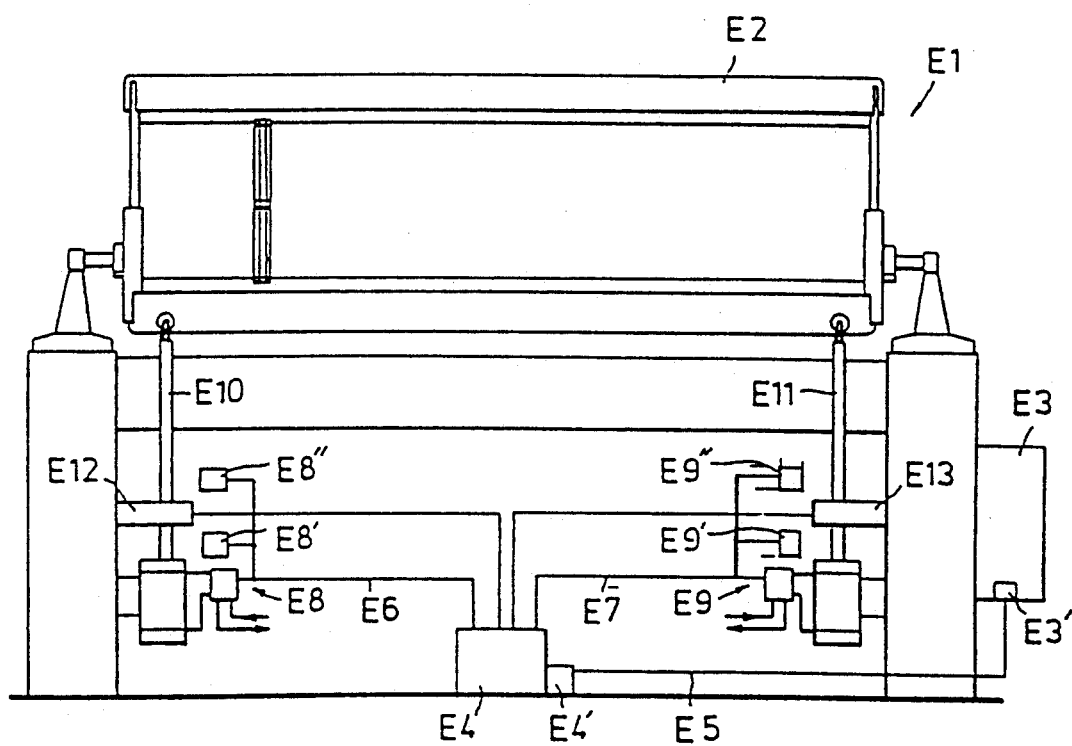
FIG. 14 shows, in principle, a dobby (shaft weaving machine) comprising a computer system.

In FIG. 14, a dobby (=shaft weaving machine) is symbolically represented with E1. The machine is assumed to be already known and will only be described here in connection with the invention. A shaft is indicated with E2 and the machine is of the type which is provided with a control unit E3 which is computerized or has been made electronic. The shaft frames are assigned a computerized control unit E4 according to the above. The units E3 and E4 communicate in accordance with the above via a two-wire serial communication connection E5. The unit controls, via first and second serial and digital connections E6 and E7, units E8, E8', E8" and E9, E9', E9" respectively. Each shaft frame is controlled by means of two units E8, E9 etc. By means of the units, the shafts E10, E11 are controlled with the aid of a servo function which is described in greater detail below. Position indicators E12 and E13 respectively are arranged on the shafts. The connection units for the control units E3 and E4 to the connection E5 are indicated with E3' and E4' respectively which form communication parts.

Figure 15:
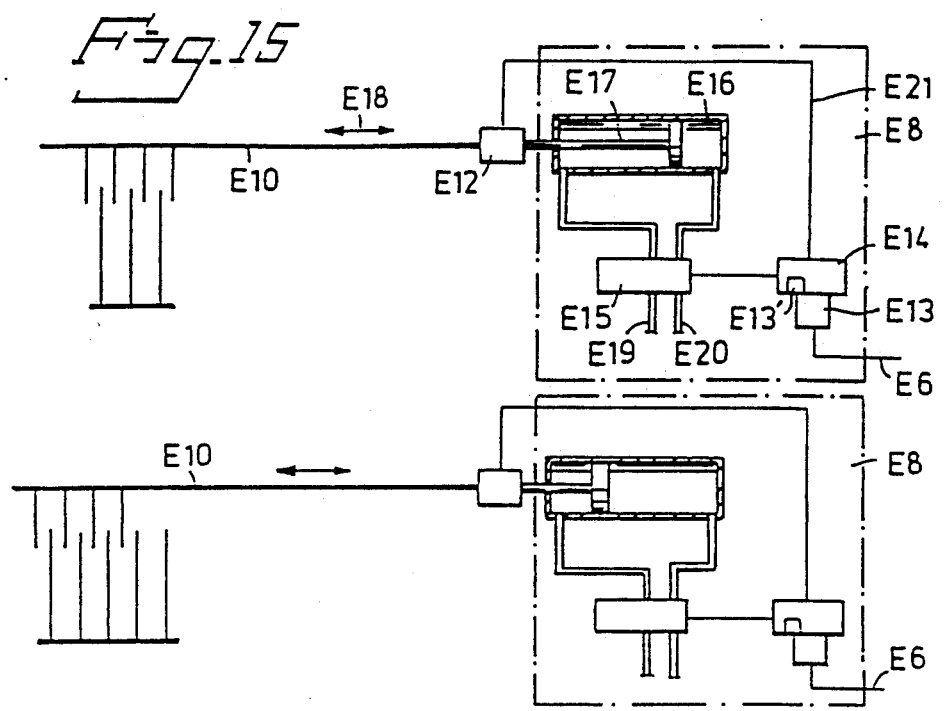
FIG. 15 shows, in the form of a skeleton diagram, the control of a shaft according to FIG. 9.

FIG. 15 shows the unit E8 in which in both the figures the shaft E10 adopts different functional positions. The unit comprises a communication unit E13 and a control element E14. The control element controls a servo valve E15 which forms part of the execution element E16 which takes the form of a hydraulic cylinder with a displaceable piston E17. The piston is connected to the shaft E10 in a manner known per se. The shaft is displaceable in the longitudinal direction of the arrows E18. The serial communication loop E16 is connected to the communication unit E13. In FIG. 1 the unit has been indicated so that it comprises the execution element with associated servo valve. However, the latter parts can of course form part of a separate element, the parts E13 and E14 forming the unit. According to the above, the control element/the unit is provided with a memory element E13' or connected to such a memory element. The servo valve is connected to the power supply line E19 and E20, e.g. constituting pressure and return lines in a hydraulic system.

Figure 16:
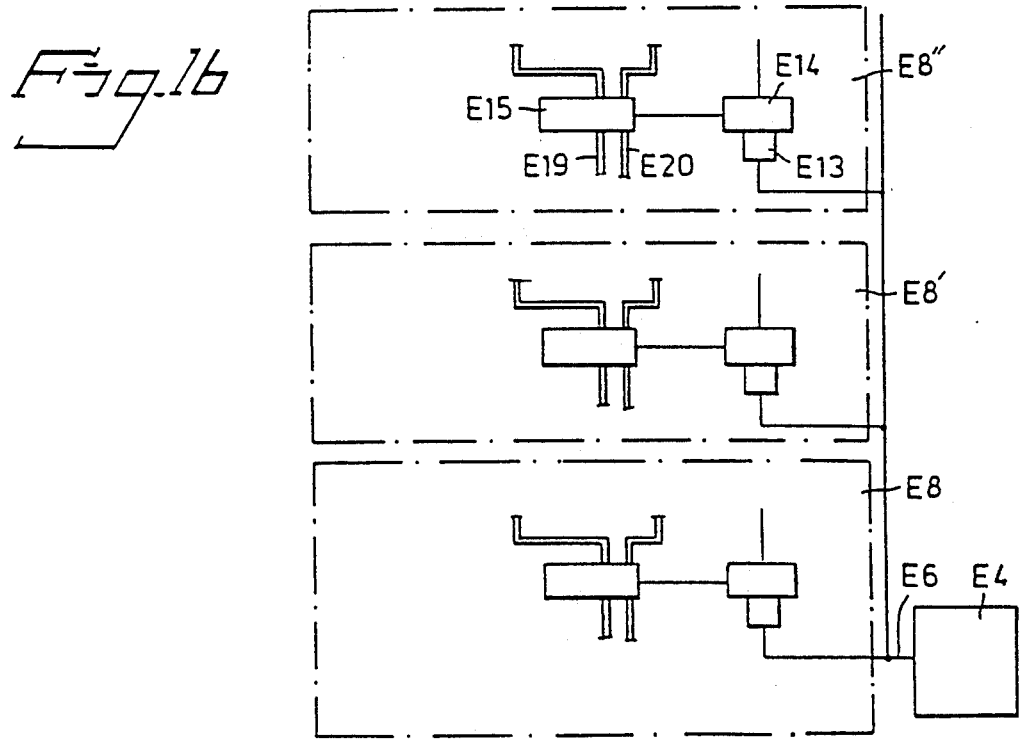
FIG. 16 shows, in the form of a skeleton diagram, the connection of a number of units.

FIG. 16 shows in detail how the units E8, E8' and E8" according to FIG. 14 and execution elements belonging to them are arranged in relation to the serial digital connection.

A weaving machine has in general a large number of shafts.

The operation phase is started by the weaving machine giving a trigger signal at the correct angular position of the machine. The weaving machine transmits identification codes for the next sequence, whereupon repetition takes place from the trigger signal being given at the correct angular position of the machine.

The position indicator E12 is fed back via a feedback loop to the control element/the unit E14. The feedback can take place continuously and/or stepwise, preferably with conspicuously frequent intervals.

The invention deals with the fabric pattern data as well. It can be advantageous to send signal indicating the number of picks instead of concrete control signals representing speeds and accelerations to the yarn feed elements. In such a way it is possible to develop the design of the yarn feed element independent of the development of the weaving machine and vice versa. In order to obtain best possible characteristics for the machine and feed elements the control system and the mechanical system have to be well adapted/integrated to each other. Such an adaption/integration is most easy to conduct within the frame of the feed elements. The same is valid for controlled yarn brakes, spool shift devices, etc. Then it is important to propose a system in which the weaving machine devides what to do and each unit decides by itself how to do the wished function/operation.

A data communication connection with a few wires can be utilized. In one embodiment, with a few wires means a connection with e.g. two wires/conductors for the signal transmission and access to earth (earth conductor) and a screened conductor which prevents interference into and out of the system. Two-wire is to be read with these conditions as the starting point.

The invention is not limited to the embodiment shown above by way of example, but can be subjected to modifications within the scope of the following claims.

I claim:

1. A yarn supply system for a textile machine, for providing a selected weaving pattern, comprising:
    a plurality of yarn feeders each yarn feeder having a yarn supply, a yarn storage zone, a yarn winding-on element for supplying yarn from said yarn supply to said yarn storage zone, and a variable speed control for operating said yarn winding-on element, said variable speed control including a function control means for controlling operation of said variable speed control so that said yarn feeder continuously maintains in said storage zone a stock of yarn sufficient to provide the amount of yarn needed for achieving the selected weaving pattern of the textile machine;
    a data-processing means containing programmed or stored information for establishing the selected weaving pattern, said data-processing means including yarn feed rate anticipating means for ascertaining, in advance and from the programmed or stored information, an upcoming change in yarn consumption of the textile machine in accordance with the selected weaving pattern, and signalling means operably connected to said variable speed controls for sending a control message to said variable speed control of one or more of said yarn feeders in response to a determination by said yarn feed rate anticipating means that an acceleration, speed or deceleration of the yarn in said one or more feeders would exceed one or more respective predetermined values if said control message is not sent;
    said variable speed control further including means for adjusting a feed rate of said winding-on element in response to said control message in advance of the upcoming change in yarn consumption of the textile machine to prevent the acceleration, speed or deceleration of the yarn from exceeding said one or more respective predetermined values when said upcoming change in yarn consumption actually occurs.

2. A yarn supply system as claimed in claim 1, including network means connecting each said function control means of said plurality of yarn feeders to form a network, said network means including a message transmission connection connected to each said function control means and said data-processing means for transferring messages therebetween.

3. A system as claimed in claim 1 in which each said function control means of said plurality of yarn feeders include memory portions for receiving and storing electrical messages received from said data-processing means, said messages containing addresses for directing the messages to one or more of said function control means.

4. A system as claimed in claim 1, including feedback means in each said yarn feeder for feeding back to the respective function control means and said data-processing means signals indicative of the changes caused by said control message.

5. A yarn supply system for a textile machine for providing a selected weaving pattern, comprising:
    a plurality of yarn feeders, each yarn feeder having a yarn supply, a yarn storage zone, a yarn winding-on element for supplying yarn from said yarn supply to said yarn storage zone, a variable speed motor for said yarn winding-on element, and a variable speed control for said motor, said variable speed control including a function control means for controlling operation of said variable speed control so that said yarn feeder continuously maintains in said storage zone a stock of yarn sufficient to provide the amount of yarn needed for achieving the selective weaving pattern of the textile machine;
    a control computer containing programmed or stored information for establishing the weaving pattern and connected to said function control means of said variable speed controls of said yarn feeders for providing first electrical signals to initialize said yarn feeders for operation in conjunction with said textile machine, said control computer including yarn feed rate anticipating means for ascertaining, in advance and from the programmed or stored information, an upcoming change in yarn consumption of the textile machine in accordance with the selected weaving pattern, and electrical signal means operably connected to said function control means of said variable speed controls for supplying second electrical signals which initiate a control action of said variable speed control of one or more of said yarn feeders in response to a determination by said yarn feed rate anticipating means that an acceleration, speed or deceleration of the yarn in said one or more feeders will exceed one or more respective predetermined values if said control action is not taken;
    said variable speed control further including means for adjusting a feed rate of said winding-on element in response to said control action in advance of the upcoming change in yarn consumption of the textile machine to prevent the acceleration, speed or deceleration of the yarn from exceeding said one or more respective predetermined values when said upcoming change in yarn consumption actually occurs.

6. A yarn supply system for a textile machine for providing a selected weaving pattern, comprising:
    a plurality of yarn feeders, each yarn feeder having a yarn supply, a yarn storage zone, a yarn winding-on element for supplying yarn from said yarn supply to said yarn storage zone and a variable speed control for operating said yarn winding-on element, said variable speed control including a function control means for controlling operation of said variable speed control so that said yarn feeder continuously maintains in said storage zone a stock of yarn sufficient to provide the amount of yarn needed for achieving the selected weaving pattern of the textile machine;

a main control computer containing programmed or stored information for establishing the selected weaving pattern, said main control computer including yarn feed rate anticipating means for ascertaining, in advance and from the programmed or stored information, an upcoming change in yarn consumption of the textile machine in accordance with the selected weaving pattern, and electrical signal means operably connected to said function control means for initiating a control action of said variable speed control of one or more of said yarn feeders in response to a determination by said yarn feed rate anticipating means that an acceleration, speed or deceleration of the yarn in one or more said feeders will exceed one or more respective predetermined values if said control action is not taken;

said function control means further including means for adjusting a feed rate of said winding-on element in response to said control action in advance of the upcoming change in yarn consumption of the textile machine to prevent the acceleration, speed or deceleration of the yarn from exceeding said one or more predetermined values when said upcoming change in yarn consumption actually occurs;

said data processing means further including means operable during start-up of the system to assign an identification number to each said yarn feeder and to establish the operational requirements in said function control means for each said yarn feeder, and means operable during operation of the system to supply instantaneous signals for operating each said variable speed control.

7. A method of weaving utilizing a textile machine comprising a plurality of yarn feeders, each yarn feeder having a yarn supply, a yarn storage zone, a yarn winding-on element for supplying yarn from said yarn supply to said yarn storage zone, a variable speed control for operating said yarn winding-on element and a function control means for controlling operation of said variable speed control, and a data-processing means containing programmed or stored information for establishing a selected weaving pattern, and for sending a control message to one or more of said yarn feeders, comprising the steps of:

continuously monitoring the consumption of yarn by the textile machine;

operating said yarn winding-on elements in response to the results of said monitoring step to continuously maintain stocks of yarn in said yarn storage zones adequate to provide the amounts of yarn needed for achieving the selected weaving pattern;

ascertaining, in advance from the programmed or stored information in said data-processing means, an upcoming change in yarn consumption of the textile machine in accordance with the selected weaving pattern;

sending said control message to one or more of said yarn feeders, in response to a determination that an acceleration, speed or deceleration of the yarn in said one or more feeders will exceed one or more respective predetermined values if said control message is not sent;

adjusting said variable speed control of said one or more yarn feeders before said upcoming change in yarn consumption actually occurs; and preventing the acceleration, speed or deceleration of the yarn from exceeding said one or more respective predetermined values when said upcoming change in yarn consumption actually occurs while still maintaining adequate stocks of yarn in said yarn storage zones.

8. A yarn supply system for a textile machine, for providing a selected weaving pattern, comprising:

a plurality of yarn feeders for independently feeding yarn to the textile machine, each yarn feeder having a yarn supply, a yarn storage zone, a yarn winding-on element for supplying yarn from said yarn supply to said yarn storage zone, and a variable speed controller for independently operating said yarn winding-on element, said variable speed controller including means for sensing a current rate of yarn consumption by the textile machine, means for controlling a yarn feed rate of said winding-on element in response to said current rate of yarn consumption so that said yarn feeder continuously maintains in said storage zone a stock of yarn sufficient to satisfy said current rate of yarn consumption, and means for adjusting the feed rate of said winding-on element in response to a control message;

a data-processing means operably coupled to said variable speed controller for adjusting the feed rate of said winding-on element when said data-processing means determines that an upcoming change in rate of yarn consumption exceeds one or more predetermined values, said data-processing means including storage means for storing information regarding the selected weaving pattern, yarn feed rate anticipating means for ascertaining, in advance and from the information, the upcoming change in rate of yarn consumption, means for determining whether the upcoming change in rate of yarn consumption exceeds said one or more predetermined values before said sensing means senses the change in rate of yarn consumption, and signalling means for sending said control message to said adjusting means of said variable speed controller when the upcoming change in rate of yarn consumption exceeds said one or more predetermined values to prevent the acceleration, speed or deceleration of the yarn from exceeding said one or more predetermined values when said upcoming change in yarn consumption actually occurs.

* * * * *